(12) United States Patent
Hoehn et al.

(10) Patent No.: US 10,774,273 B2
(45) Date of Patent: Sep. 15, 2020

(54) PROCESS AND APPARATUS FOR RECOVERING HYDROGEN FROM RESIDUE HYDROPROCESSING

(71) Applicant: UOP LLC, Des Plaines, IL (US)

(72) Inventors: Richard K. Hoehn, Mount Prospect, IL (US); Eleftherios Adamopoulos, Gurnee, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/665,149

(22) Filed: Jul. 31, 2017

(65) Prior Publication Data

US 2019/0031965 A1 Jan. 31, 2019

(51) Int. Cl.
| | | |
|---|---|---|
| C10G 70/04 | (2006.01) | |
| C10G 45/02 | (2006.01) | |
| C10G 47/00 | (2006.01) | |
| C01B 3/56 | (2006.01) | |
| B01D 53/22 | (2006.01) | |
| B01D 71/64 | (2006.01) | |
| C01B 3/50 | (2006.01) | |
| B01D 53/14 | (2006.01) | |

(52) U.S. Cl.
CPC ......... *C10G 45/02* (2013.01); *B01D 53/1462* (2013.01); *B01D 53/226* (2013.01); *B01D 53/229* (2013.01); *B01D 71/64* (2013.01); *C01B 3/501* (2013.01); *C01B 3/56* (2013.01); *C10G 47/00* (2013.01); *B01D 2252/204* (2013.01); *B01D 2256/16* (2013.01); *C01B 2203/0405* (2013.01); *C01B 2203/0465* (2013.01); *C01B 2203/146* (2013.01); *C10G 2300/202* (2013.01); *C10G 2300/205* (2013.01)

(58) Field of Classification Search
CPC ....... C10G 67/02; C10G 70/045; B01D 53/22
See application file for complete search history.

(56) References Cited

U.S. PATENT DOCUMENTS

| | | | |
|---|---|---|---|
| 4,180,552 A | 12/1979 | Graham et al. | |
| 4,701,187 A * | 10/1987 | Choe .................... | B01D 53/226 95/53 |
| 5,082,551 A * | 1/1992 | Reynolds ................ | C10G 49/22 208/100 |
| 6,303,089 B1 | 10/2001 | Wallace et al. | |
| 6,428,606 B1 * | 8/2002 | Gottschlich .......... | B01D 53/225 95/39 |

(Continued)

FOREIGN PATENT DOCUMENTS

| | | |
|---|---|---|
| CN | 103496667 B | 3/2016 |
| WO | 2005079960 A1 | 9/2005 |

OTHER PUBLICATIONS

Badra, Membranes for hydrogen recovery in a hydrotreatment complex, Vision Tecnologica, vol. 1, Issue 2, 1994, pp. 38-44.

(Continued)

*Primary Examiner* — Michelle Stein
(74) *Attorney, Agent, or Firm* — Pascahall & Associates, LLC; James C. Paschall

(57) ABSTRACT

A membrane unit is able to recover hydrogen from a resid waste gas stream. Two membrane units provide even greater hydrogen recovery. The membrane separation is performed at conditions that allow the pressure of the recovered hydrogen to enter into a second stage of compression, saving the expense of the first stage of compression.

18 Claims, 2 Drawing Sheets

(56) References Cited

U.S. PATENT DOCUMENTS 6,572,679 B2 * 6/2003 Baker .................. B01D 53/228
                                                                        95/47

OTHER PUBLICATIONS

Bollinger, Separation Systems for Oil Refining and Production, Chemical Engineering Progress, vol. 78, Issue 10, Oct. 1982, pp. 27-32.

* cited by examiner

PROCESS AND APPARATUS FOR RECOVERING HYDROGEN FROM RESIDUE HYDROPROCESSING

FIELD

The field is the hydroprocessing of residue streams. Specifically, the field is the recovery of hydrogen from hydroprocessing residue streams.

BACKGROUND

Hydroprocessing includes processes which convert hydrocarbons in the presence of hydroprocessing catalyst and hydrogen to more valuable products. Hydrotreating is a process in which hydrogen is contacted with a hydrocarbon stream in the presence of hydrotreating catalysts which are primarily active for the removal of heteroatoms, such as sulfur, nitrogen and metals, such as iron, nickel, and vanadium from the hydrocarbon feedstock.

Residue or resid streams are produced from the bottom of a fractionation column. Resid hydrotreating is a hydrotreating process to remove metals, sulfur and nitrogen from an atmospheric residue (AR) or a vacuum residue (VR) feed, so that it can be cracked to valuable fuel products.

Hydrotreating of resid streams requires high severity. Resid desulfurization units typically have hydrodemetallization (HDM) catalyst up front, followed by hydrodesulfurization (HDS) catalyst. Slurry hydrocracking (SHC) cracks resid streams to valuable streams. Hydrogen is necessary for these reactions to proceed. Recovery of excess hydrogen from the reaction zone typically occurs from a separator overhead line which carries a vapor stream highly concentrated in methane. The separation of hydrogen from methane complicates hydrogen recovery.

In residue hydroprocessing units, hydrogen is not easily fully recovered from the cold separator vapor stream. Too little heavier hydrocarbon liquid is present in the cold separator to absorb sufficient methane from the vapor stream to achieve the required hydrogen partial pressure if recycled to the hydroprocessing reactor. Consequently, a portion of the cold vapor stream has to be purged from the process to avoid excess methane accumulation, thereby sacrificing valuable hydrogen. Several designs have been attempted to remove methane from this cold vapor stream, but none have proved economical. Recycling cold flash drum liquid to the cold separator has not economically absorbed methane because large volumes of cold flash drum liquid have to be pumped and recycled to the cold separator to absorb sufficient methane from the cold separator liquid. Adding the cold vapor purge stream as additional gas feed to a steam methane reformer hydrogen plant has not been economical because most of the cold vapor stream is hydrogen which adds to the volume of material that must be heated, cooled and passed through the reformer but it is already the product that is to be produced rendering inefficiencies. Pressure swing adsorption (PSA) has not proved economical in separating methane from hydrogen gas in the cold vapor stream because the PSA vent gas pressure is too low requiring another stage of compression to recycle the hydrogen to the hydroprocessing unit which adds to capital and operational expense. Moreover, PSA is touted for high selectivity, but lower recovery of hydrogen; whereas high hydrogen recovery is necessary to make recovery of hydrogen from the cold vapor purge stream economical. Consequently, refiners typically route the cold vapor purge stream and all of its hydrogen to the fuel gas header to be burned as low grade fuel.

Membrane gas separation is of special interest to petroleum producers and refiners, chemical companies, and industrial gas suppliers. Several applications of membrane gas separation have achieved commercial success in hydrogen removal from methane. The membranes most commonly used in commercial gas and liquid separation applications are asymmetric polymeric membranes having a thin nonporous selective skin layer that performs the separation. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. Membrane separation is believed to have higher recovery of hydrogen from methane, but lower hydrogen selectivity.

It would be highly desirable to efficiently recovery hydrogen from a resid hydroprocessing process.

BRIEF SUMMARY

The subject process and apparatus recovers hydrogen from a residue hydroprocessing unit from a vapor purge stream. The vapor purge stream contains substantial hydrogen but it is mixed with methane which makes it difficult to purify. A membrane unit is employed to recover hydrogen from the hydroprocessed vapor purge stream. In an aspect, two membrane units are employed to recover hydrogen from the vapor purge stream in the permeate streams which can be compressed and recycled to the resid hydroprocessing unit.

DEFINITIONS

Figure 1:
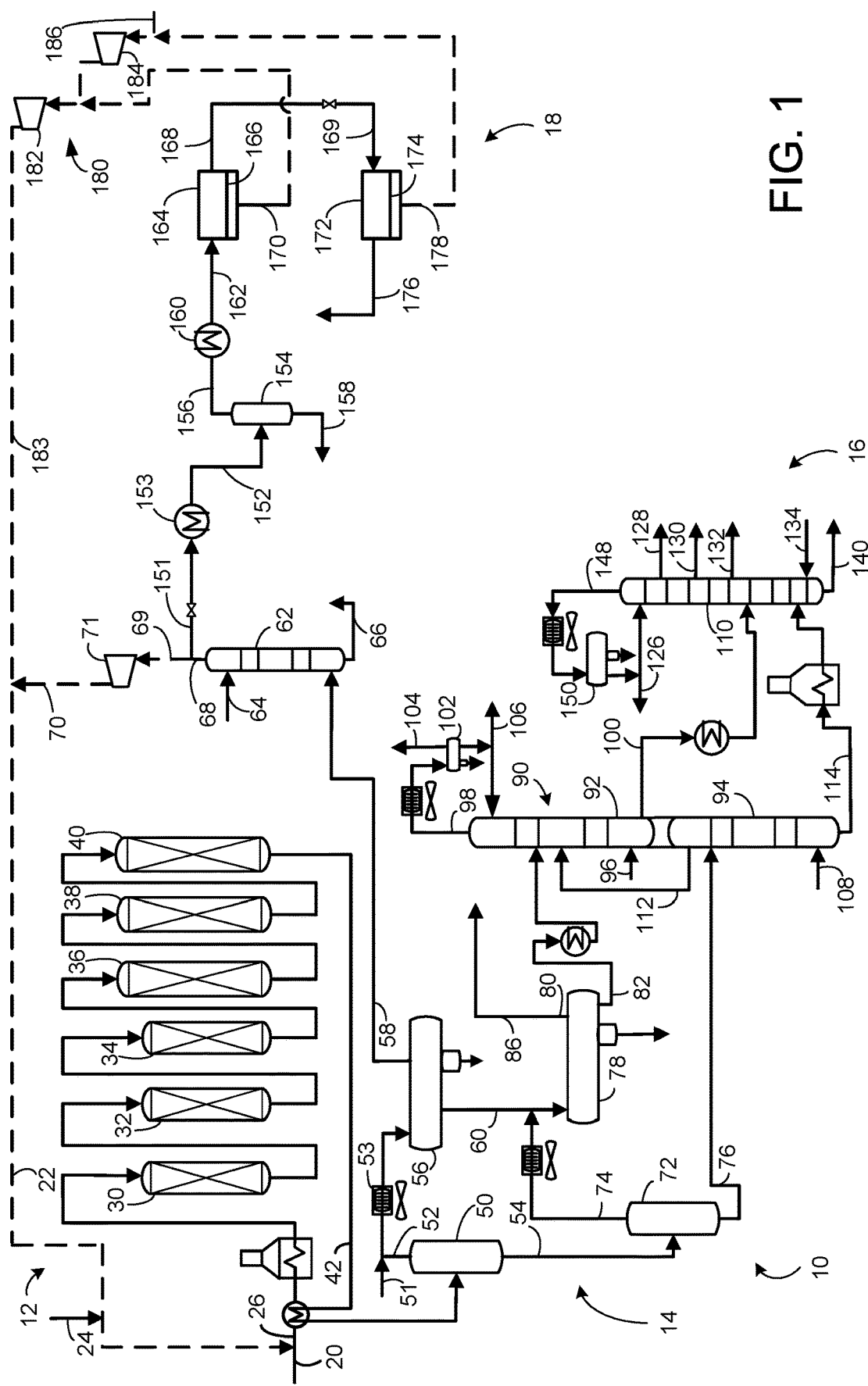
FIG. 1 is a schematic drawing of a hydroprocessing unit comprising a resid hydrotreating unit.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

As used herein, the term "predominant" or "predominate" means greater than 50%, suitably greater than 75% and preferably greater than 90%.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Absorber and scrubbing columns do not include a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The overhead pressure is the pressure of the overhead vapor at the vapor outlet of the column. The bottom temperature is the liquid bottom outlet temperature. Overhead lines and bottoms lines refer to the net lines from the column downstream of any reflux or reboil to the column unless otherwise indicated. Stripping columns omit a reboiler at a bottom of the column and instead provide heating requirements and separation impetus from a fluidized inert vaporous media such as steam.

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "initial boiling point" (IBP) means the temperature at which the sample begins to boil using ASTM D-7169.

As used herein, the term "T5", "T70" or "T95" means the temperature at which 5 mass percent, 70 mass percent or 95 mass percent, as the case may be, respectively, of the sample boils using ASTM D-7169.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator which latter may be operated at higher pressure.

DETAILED DESCRIPTION

The subject process and apparatus recovers hydrogen from a resid hydroprocessed vapor stream for recycle to the process. In FIG. 1, the apparatus and process 10 comprise a hydroprocessing unit for hydrotreating a hydrocarbon resid stream which includes a hydroprocessing unit 12, a separation section 14, a fractionation section 16 and a hydrogen recovery section 18.

A hydrocarbon resid stream in resid line 20 and a hydrogen stream in a hydrogen line 22 are fed to the hydroprocessing unit 12. A stream of water in water feed line 24 may also delivered to the hydroprocessing unit 12.

In one aspect, the process and apparatus 10 described herein are particularly useful for hydrotreating a hydrocarbon feed stream comprising a resid hydrocarbonaceous feedstock. A resid feedstock may be taken from a bottom of an atmospheric fractionation column or a vacuum fractionation column. A suitable resid feed is AR having an T5 between about 316° C. (600° F.) and about 399° C. (750° F.) and a T70 between about 510° C. (950° F.) and about 704° C. (1300° F.). VR having a T5 in the range between about 482° C. (900° F.) and about 565° C. (1050° F.) may also be a suitable feed. VR, atmospheric gas oils having T5 between about 288° C. (550° F.) and about 315° C. (600° F.) and vacuum gas oils (VGO) having T5 between about 316° C. (600° F.) and about 399° C. (750° F.) may also be blended with the AR to make a suitable resid feed. Deasphalted oil, visbreaker bottoms, clarified slurry oils, and shale oils may also be suitable resid feeds alone or by blending with AR or VR.

Typically, these resid feeds contain a significant concentration of metals which have to be removed before catalytic desulfurization can occur because the metals will adsorb on the HDS catalyst making it inactive. Typically, suitable resid feeds include about 50 to about 500 wppm metals but resid feeds with less than about 200 wppm metals may be preferred. Nickel, vanadium and iron are some of the typical metals in resid feeds. Resid feeds may comprise about 5 to about 200 wppm nickel, about 50 to about 500 wppm vanadium, about 1 to about 150 wppm iron and/or about 5 to about 25 wt % Conradson carbon residue. Resid feeds may comprise about 10,000 wppm to about 60,000 wppm sulfur. Frequently refiners have a targeted product specification depending on downstream application of hydrotreated products, primarily on sulfur and metal content.

The hydrogen stream in the hydrogen line 22 may join the resid stream in the resid line 20 after being supplemented with water to provide a resid feed stream in a resid feed line 26. The resid feed stream in the resid feed line 26 may be heated in a fired heater. The heated resid feed stream in the resid feed line 26 may be fed to the resid hydroprocessing unit 12 which may comprise several hydroprocessing reactors. With the water stream from line 24 added to the hydrogen stream in the hydrogen line 22, the hydrogen stream, the water stream and the resid feed stream in line 20 may all be heated together in the fired heater in resid feed line 26.

Hydrotreating is a process wherein hydrogen is contacted with hydrocarbon in the presence of hydrotreating catalysts which are primarily active for the removal of heteroatoms, such as sulfur, nitrogen and metals from the hydrocarbon feedstock. The hydroprocessing unit 12 may comprise three hydroprocessing reactors 30, 32, 34 comprising three demetallation reactors including a first demetallation reactor 30, a second demetallation reactor 32 and a third demetallation reactor 34. More or less demetallation reactors may be used, and each demetallation reactor 30, 32 and 34 may comprise a part of a demetallation reactor or comprise one or more demetallation reactors. Each demetallation reactor 30, 32 and 34 may comprise part of a catalyst bed or one or more catalyst beds in one or more demetallation reactor vessels. In the FIG. 1, the first three demetallation reactors 30, 32 and 34 each comprising a single bed of hydrodemetallation (HDM) catalyst.

Suitable HDM catalysts for use in the resid hydrotreating unit 12 are any conventional resid hydrotreating catalysts and include those which are comprised of at least one Group VIII metal, preferably iron, cobalt and nickel, more preferably nickel and/or cobalt and at least one Group VI metal, preferably molybdenum and tungsten, on a high surface area support material, preferably alumina. It is within the scope of the present invention that more than one type of hydrotreating catalyst be used in the same reaction vessel or catalyst bed. The Group VIII metal is typically present on the HDM catalyst in an amount ranging from about 1 to about 10 wt %, preferably from about 2 to about 5 wt %. The Group VI metal will typically be present on the HDM catalyst in an amount ranging from about 1 to about 20 wt %, preferably from about 2 to about 10 wt %.

In an embodiment, the first demetallation reactor 30, the second demetallation reactor 32 and the third demetallation reactor 34 may comprise a HDM catalyst comprising cobalt and molybdenum on gamma alumina. The HDM catalyst in the first demetallation reactor 30, the second demetallation reactor 32 and the third demetallation reactor 34 may have a bimodal pore size distribution with at least about 25% of the pores on the catalyst particle being characterized as small pores, in the micropore or mesopore range of about 5 to no more than about 30 nm and at least about 25% of the pores being characterized as large pores, in the mesopore or macropore range of greater than about 30 to about 100 nm. The large pores are more suited for demetallation and the small pores are more suited for desulfurization. The ratio of large pores to small pores may decrease from upstream to downstream in the first demetallation reactor 30, the second demetallation reactor 32 and the third demetallation reactor 34. In an aspect, the first demetallation reaction 30 will have a larger ratio of large pores to small pores than the second demetallation reactor 32. In a further aspect, the second demetallation reaction 32 will have a larger ratio of large pores to small pores than the third demetallation reactor 34.

The resid feed stream in line 26 may be fed to the first demetallation reactor 30, the second demetallation reactor 32 and the third demetallation reactor 34. The first demetallation reactor 30, the second demetallation reactor 32 and the third demetallation reactor 34 may be arranged in series such that the effluent from one cascades into the inlet of the other. It is contemplated that more or less demetallation reactors may be provided in the hydroprocessing unit 12. The first demetallation reactor 30, the second demetallation reactor 32 and the third demetallation reactor 34 are intended to demetallize the heated resid stream, so to reduce the metals concentration in the fresh feed stream by about 40 to about 100 wt % and typically about 65 to about 95 wt % to produce a demetallized effluent stream exiting one, some or all of the first demetallation reactor 30, the second demetallation reactor 32 and the third demetallation reactor 34. The metal content of the demetallized resid stream may be less than about 50 wppm and preferably between about 1 and about 25 wppm. The first demetallation reactor 30, the second demetallation reactor 32 and the third demetallation reactor 34 may also desulfurize and denitrogenate the resid stream. A demetallized resid stream reduced in metals and sulfur concentration relative to the resid feed stream fed to the reactor may exit first demetallation reactor 30, the second demetallation reactor 32 and the third demetallation reactor 34.

Preferred reaction conditions in each of the first demetallation reactor 30, the second demetallation reactor 32 and the third demetallation reactor 34 include a temperature from about 66° C. (151° F.) to about 455° C. (850° F.), suitably 316° C. (600° F.) to about 427° C. (800° F.) and preferably 343° C. (650° F.) to about 399° C. (750° F.), a pressure from about 2.1 MPa (gauge) (300 psig) to about 27.6 MPa (gauge) (4000 psig), preferably about 13.8 MPa (gauge) (2000 psig) to about 20.7 MPa (gauge) (3000 psig), a liquid hourly space velocity of the fresh resid feed from about 0.1 hr$^{-1}$ to about 5 hr$^{-1}$, preferably from about 0.2 to about 2 hr$^{-1}$, and a hydrogen rate of about 168 Nm$^3$/m$^3$ (1,000 scf/bbl) to about 1,680 Nm$^3$/m$^3$ oil (10,000 scf/bbl), preferably about 674 Nm$^3$/m$^3$ oil (4,000 scf/bbl) to about 1,011 Nm$^3$/m$^3$ oil (6,000 scf/bbl).

The first hydroprocessing unit 12 may also comprise three more hydroprocessing reactors 36, 38, 40 comprising three desulfurization reactors including a first desulfurization reactor 36, a second desulfurization reactor 38 and a third desulfurization reactor 40. More or less desulfurization reactors may be used, and each desulfurization reactor 36, 38 and 40 may comprise a part of a desulfurization reactor or comprise one or more desulfurization reactors. Each desulfurization reactor 36, 38 and 40 may comprise part of a catalyst bed or one or more catalyst beds in one or more desulfurization reactor vessels. In FIG. 1, the three desulfurization reactors 36, 38 and 40 each comprise a single bed of hydrodesulfurization (HDS) catalyst.

A demetallized stream exits the third demetallization reactor 34 with a reduced concentration of metals, sulfur and nitrogen relative to the resid stream in line 20 and is fed to the a first desulfurization reactor 36, a second desulfurization reactor 38 and a third desulfurization reactor 40 which may include a HDS catalyst. The HDS catalyst may comprise nickel or cobalt and molybdenum on gamma alumina to convert organic sulfur to hydrogen sulfide. The HDS catalyst may have a monomodal distribution of mesoporous pore sizes with at least 50% of the pores on the catalyst particle being in the range of 10-50 nm. The first desulfurization reactor 36, the second desulfurization reactor 38 and the third desulfurization reactor 40 may be operated in series with the effluent from the first desulfurization reactor 36 cascading into an inlet of the second desulfurization reactor 38 and the effluent of the second desulfurization reactor cascading into an inlet of the third desulfurization reactor 40. The first desulfurization reactor 36, the second desulfurization reactor 38 and the third desulfurization reactor 40 desulfurize the demetallized resid feed to reduce the sulfur concentration in the demetallized resid stream by about 40 to about 100 wt % and typically about 65 to about 95 wt % to produce a hydroprocessed resid stream exiting the third desulfurization reactor 40 of the hydroprocessing unit 12 in a hydroprocessed resid effluent line 42. The bulk of the desulfurization may occur in first demetallation reactor 30, the second demetallation reactor 32 and the third demetallation reactor 34.

Preferred reaction conditions in each of the first desulfurization reactor 36, the second desulfurization reactor 38 and the third desulfurization reactor 40 include a temperature from about 66° C. (151° F.) to about 455° C. (850° F.), suitably 316° C. (600° F.) to about 427° C. (800° F.) and preferably 343° C. (650° F.) to about 399° C. (750° F.), a pressure from about 2.1 MPa (gauge) (300 psig) to about 27.6 MPa (gauge) (4000 psig), preferably about 13.8 MPa (gauge) (2000 psig) to about 20.7 MPa (gauge) (3000 psig), a liquid hourly space velocity of the fresh resid feed from about 0.1 hr$^{-1}$ to about 5 hr$^{-1}$, preferably from about 0.2 to about 2 hr$^{-1}$, and a hydrogen rate of about 168 Nm$^3$/m$^3$ (1,000 scf/bbl) to about 1,680 Nm$^3$/m$^3$ oil (10,000 scf/bbl), preferably about 674 Nm$^3$/m$^3$ oil (4,000 scf/bbl) to about 1,011 Nm$^3$/m$^3$ oil (6,000 scf/bbl).

The hydroprocessed resid stream may exit the last desulfurization reactor 40 of the hydroprocessing unit 12 in the hydroprocessed resid effluent line 42, be cooled by heat exchange with the resid feed stream in line 26 and enter the separation section 14 comprising a hot separator 50. The separation section 14 comprises one or more separators in downstream communication with the hydroprocessing unit 12 including the hot separator 50. The hydroprocessed resid effluent line 42 delivers a cooled hydroprocessed resid effluent stream to the hot separator 50. Accordingly, the hot separator 50 is in downstream communication with a hydroprocessing reactor comprising the first demetallation reactor 30, the second demetallation reactor 32, the third demetallation reactor 34, the first desulfurization reactor 36, the second desulfurization reactor 38 and the third desulfurization reactor 40 in the hydroprocessing unit 12.

The hot separator 50 separates the hydroprocessed resid effluent stream to provide a hydrocarbonaceous, hot vapor stream in a hot overhead line 52 and a hydrocarbonaceous, hot liquid stream in a hot bottoms line 54. The hot separator 50 may operate at about 177° C. (350° F.) to about 385° C. (725° F.) and preferably operates at about 232° C. (450° F.) to about 315° C. (600° F.). The hot separator 50 may be operated at a slightly lower pressure than the last desulfurization reactor 40 accounting for pressure drop through intervening equipment. The hot separator 50 may be operated at pressures between about 3.4 MPa (gauge) (493 psig) and about 20.4 MPa (gauge) (2959 psig). The hydrocarbonaceous, hot vapor stream in the hot overhead line 52 may have a temperature of the operating temperature of the hot separator 50. The hot liquid stream in the hot bottoms line 54 may be fed to a hot flash drum 72.

The hot vapor stream in the first hot overhead line 52 may be cooled in a cooler 53 before entering a cold separator 56. The cold separator 56 may be in downstream communication with the hot overhead line 52. Accordingly, the cold separator 56 is in downstream communication with a hydroprocessing reactor comprising the first demetallation reactor 30, the second demetallation reactor 32, the third demetallation reactor 34, the first desulfurization reactor 36, the second desulfurization reactor 38 and the third desulfurization reactor 40 in the hydroprocessing unit 12.

As a consequence of the reactions taking place in the hydroprocessing unit 12 wherein nitrogen, chlorine and sulfur are reacted from the feed, ammonia, hydrogen chloride and hydrogen sulfide are formed. The hot separator 50 removes a predominant portion of the hydrogen sulfide, hydrogen chloride and ammonia from the hot liquid stream in the hot bottoms line 54 into the hot vapor stream in the hot overhead line 52. At a characteristic sublimation temperature, ammonia and hydrogen sulfide will combine to form ammonium bisulfide and ammonia, and hydrogen chloride will combine to form ammonium chloride. Each compound has a characteristic sublimation temperature that may allow the compound to coat equipment, particularly heat exchange equipment, impairing its performance. To prevent such deposition of ammonium bisulfide or ammonium chloride salts in the hot overhead line 52 transporting the first stage vapor stream, a suitable amount of wash water may be introduced into the hot overhead line 52 by a first water wash line 51.

The cooled hot vapor stream may be separated in the cold separator 56 to provide a cold vapor stream comprising a hydrogen-rich gas stream including ammonia, hydrogen chloride, hydrogen sulfide and methane in a cold overhead line 58 and a cold liquid stream in a cold bottoms line 60. The cold separator 56 serves to separate hydrogen rich gas from hydrocarbon liquid in the hot vapor stream which is heavily laden with methane, thus making it unsuitable for recycle to the hydroprocessing unit 12 without purging to avoid methane accumulation. The cold separator 46 may be operated at about 100° F. (38° C.) to about 150° F. (66° C.), suitably about 115° F. (46° C.) to about 145° F. (63° C.), and just below the pressure of the last hydroprocessing reactor 40 and the hot separator 50 accounting for pressure drop through intervening equipment to keep hydrogen and light gases in the overhead and normally liquid hydrocarbons in the bottoms. The cold separator 56 may be operated at pressures between about 3 MPa (gauge) (435 psig) and about 20 MPa (gauge) (2,901 psig). The cold separator 56 may also have a boot for collecting an aqueous phase. The cold liquid stream in the cold bottoms line 60 may have a temperature of the operating temperature of the cold separator 56. The cold liquid stream in the cold bottoms line 60 may be delivered to a cold flash drum 78, in an embodiment after mixing with a hot flash vapor stream in a in a hot flash overhead line 74. The cold flash drum 78 may be in downstream communication with the cold bottoms line 60 of the cold separator 56.

The cold vapor stream in the cold overhead line 58 is rich in hydrogen. Thus, hydrogen can be recovered from the cold vapor stream. However, this stream comprises much of the methane, hydrogen sulfide and ammonia separated from the hydroprocessed resid stream. In an aspect, the cold vapor stream comprises at least 3 mol % methane, suitably at least 5 mol % methane and typically at least 7 mol % methane. The cold vapor stream may be delivered to the hydrogen recovery section 18.

The cold vapor stream in the cold overhead line 58 may be passed through a trayed or packed scrubbing column 62 in the hydrogen recovery section 18. The scrubbing column 62 is in downstream communication with the cold overhead line 58. In the scrubbing column 62, the cold vapor stream is scrubbed by means of a scrubbing solvent such as an aqueous solution fed by line 64 to remove and acid gases including hydrogen sulfide and carbon dioxide by extracting them into the aqueous solution. Preferred aqueous solutions include lean amines such as alkanolamines DEA, MEA, and MDEA. Other amines can be used in place of or in addition to the preferred amines. The lean amine contacts the first stage cold vapor stream and absorbs acid gas contaminants such as hydrogen sulfide. The resultant "sweetened" cold vapor stream is taken out from an overhead outlet of the recycle scrubber column 62 in a scrubber overhead line 68, and a rich amine is taken out from the bottoms at a bottom outlet of the recycle scrubber column in a scrubber bottoms line 66. The spent scrubbing liquid from the bottoms may be regenerated and recycled back to the recycle scrubbing column 62 in line 64. The scrubbed hydrogen-rich stream emerges from the scrubber via the recycle scrubber overhead line 68.

The scrubbing column 62 may be operated with a gas inlet temperature between about 38° C. (100° F.) and about 66° C. (150° F.) and an overhead pressure of about 3 MPa (gauge) (435 psig) to about 20 MPa (gauge) (2900 psig). The hydrogen in this scrubbed, hydrogen rich vapor stream is overly concentrated in methane to be recycled to the hydroprocessing unit 12 as hydrogen in total. In an aspect, the scrubbed cold vapor stream comprises at least 3 mole % methane and typically at least 5 mole % or suitably at least 7 mole % methane. Accordingly, the methane has been conventionally removed from the scrubbed hydrogen-rich stream by purging, so the appropriate hydrogen partial pressure in the hydroprocessing unit 12 can be maintained.

A recycle gas stream of the scrubbed cold vapor stream in the scrubber overhead line 68 is routed to a recycle gas compressor 71 via a recycle gas line 69. A compressed recycle hydrogen stream in a recycle hydrogen line from the recycle gas compressor 71 joins the makeup gas stream in the make-up gas line 183 and is routed to the hydroprocessing unit 12 via the hydrogen line 22. A purge vapor stream may be taken from the scrubbed vapor stream in the scrubber overhead line 68 and be forwarded as a process vapor stream to the membrane separation unit 18 in a membrane feed line 151. The process vapor stream may let down in pressure, according to the mechanical design limits of the membrane separation unit 18. The depressurized process vapor stream may be cooled in a cooler 153 to a temperature between about 32° C. (90° F.) and about 43° C. (110° F.) to provide a depressurized, cooled, process vapor stream in a cooler line 152. The depressurized, cooled, process vapor stream 152 may contain some liquid, which is removed in a knockout liquid line 158 from knockout drum 154. The knocked out liquid may be fed to the cold stripper 92. The dried, depressurized, cooled, process vapor stream may then be heated in a heater 160 to a temperature between about 49° C. (120° F.) and about 71° C. (160° F.) to provide a heated, dried, cooled, process vapor stream in heated line 162. In an aspect, the heated, dried, cooled, process vapor stream may be superheated, such as by the heater 160, to avoid the formation of liquid which would adversely affect the operation of the fibers in the membrane separation unit 18. The depressurized, heated, dried, cooled, process vapor stream is taken as a purge vapor stream in a first membrane feed line 162. The purge vapor stream in the first membrane feed line 162 is about 50 to about 100% of the pressure of the cold vapor stream in cold overhead line 58. Suitably, the first membrane feed vapor stream in the first membrane feed line 162 is no less than about 70% of the pressure of the cold vapor stream in cold overhead line 58. The purge vapor stream in the first membrane feed line 162 may be no less than about 50% of the pressure of the cold vapor stream in cold overhead line 58. Preferably, the purge vapor stream in the first membrane feed line 162 may be no less than about 70% of the pressure of the cold vapor stream in cold overhead line 58. The pressure of the purge vapor stream in the first membrane feed line 162 may be between about 10.3 MPa (1500 psig) and about 13. MPa (2000 psig).

The purge vapor stream in the first membrane feed line 162 is fed to a first membrane unit 164. The first membrane unit comprises a first membrane 166 and is in downstream communication with the scrubber column 62 via the membrane feed line 151. The first membrane 166 may comprise a high selectivity polyimide membrane available from UOP LLC.

In an aspect, the membrane may comprise a polyimide polymer with hydroxyl and acetoxy functional groups particularly suited for separation of methane from hydrogen. Other suitable membranes may include cellulose acetate, polysulfone or polyimide/polyamide. The polyimide polymer with hydroxyl and acetoxy functional groups that may be used for making the polyimide membrane suitable for methane-hydrogen separation may have a weight average molecular weight in the range of 50,000 to 1,000,000 Daltons, preferably between 70,000 to 500,000 Daltons.

A suitable membrane comprising an aromatic polyimide poly(2,2'-bis-(3,4-dicarboxyphenyl)hexafluoropropane dianhydride-3,3'-dihydroxy-4,4'-diamino-biphenyl-3,3'-di-acetoxy-4,4'-diamino-biphenyl) (abbreviated as 6FDA-HAB—OH-OAc) may be synthesized from the condensation reaction of 2,2'-bis-(3,4-dicarboxyphenyl) hexafluoropropane dianhydride (6FDA) with 3,3'-dihydroxy-4,4'-diamino-biphenyl (HAB) in DMAc or NMP polar solvent by a two-step process involving the formation of the poly(amic acid) followed by a solution imidization process. Acetic anhydride may be used as a dehydrating agent and for the reaction with hydroxyl groups on the polyimide polymer chain to achieve a molar ratio of 3:1 for hydroxyl/acetoxy in 6FDA-HAB—OH-OAc polyimide. 13 wt % of 6FDA-HAB—OH—OAc may be dissolved in 87 wt % of NMP solvent. The mixture may be mechanically stirred for 2 hours to form a homogeneous 6FDA-HAB—OH-OAc casting dope. The resulting homogeneous casting dope may be filtered and allowed to degas overnight. The 6FDA-HAB—OH-OAc polyimide dense film membrane may then be prepared from the bubble free casting dope on a clean glass plate using a doctor knife with a 20-mil gap. The membrane together with the glass plate may then be put into a vacuum oven. The solvents may then be removed by slowly increasing the vacuum and the temperature in the vacuum oven. Finally, the membrane may be dried at 200° C. under vacuum for 48 hours to completely remove the residual solvents to form a polymer membrane in dense film.

In the first membrane unit 164, the first membrane feed vapor stream contacts one side of the first membrane 166 which allows more of the hydrogen to diffuse through the membrane than methane. A first permeate stream is removed from an opposite side of the first membrane 166 comprising a greater proportion of hydrogen than the purge vapor stream and a smaller proportion of methane than the purge vapor stream. A retentate stays on the one side of the first membrane and has a greater proportion of methane than the purge vapor stream and a smaller proportion of hydrogen that the purge vapor stream. From the first membrane unit 164, the hydrogen concentration in a first retentate stream in a first retentate line 168 may be at least about 40 mol % with the methane concentration being no more than about 40 mol %. Hydrogen concentration in the first retentate stream may be least about 45 mol % and methane concentration may be no more than about 35 mol %. From the first membrane unit 164, the hydrogen concentration in a first permeate stream in a first permeate line 170 may be at least about 98 mol % with the methane concentration being less than about 1%. Hydrogen concentration in the first permeate stream may be at least about 99 mol % and methane concentration may be less than about 0.7 mol %. The pressure in the first retentate stream in the first retentate line 168 may be essentially the same as in the purge vapor stream. The pressure in the first permeate stream in the first permeate line 170 may be roughly between about 3.5 MPa (500 psig) and about 5.5 MPa (800 psig) which may be less than half of the pressure in the purge vapor stream. The first membrane 166 can be installed into the first membrane unit 164 with or without support backing as a plurality of tubes. The first membrane unit feed vapor stream may be fed to inside the tubes with the permeate diffusing peripherally out of the tubes.

The first permeate stream in first permeate line 170 may be fed to a compressor 182 for compression and feed to a hydroprocessing unit. The compressor is in downstream communication with the first membrane unit 164, specifically the other side of the first membrane 166. The first permeate stream has sufficient pressure to be fed to the compressor 182 that is a second stage compressor in a compression train 180. We have found that the first retentate stream leaving a first membrane unit 164 in the first retentate line 168 still has substantial hydrogen that can be recovered. Accordingly, the first retentate stream may be let down in pressure by about 2.1 MPa (300 psig) to about 2.8 MPa (400 psig) to provide a depressurized, first retentate stream in a second membrane feed line 169. The depressurized, first retentate stream is fed to a second membrane unit 172 comprising a second membrane 174 in an aspect after being let down in pressure. The second membrane unit 172 is in downstream communication with the first membrane unit 164, specifically the one side of the first membrane 166.

In the second membrane unit 172 the depressurized, first retentate stream contacts one side of the second membrane 174 which allows more of the hydrogen to diffuse through the membrane than methane. A second permeate stream is removed from an opposite side of the second membrane comprising a greater proportion of hydrogen than the first retentate stream and a smaller proportion of methane than in the first retentate stream. A second retentate stream stays on the one side of the second membrane 174 and has a greater proportion of methane than the first retentate stream and a smaller proportion of hydrogen that the first retentate stream. From the second membrane unit 172, the hydrogen concentration in the second retentate stream in a second retentate line 176 may be less than about 5 mol % with the methane concentration being at least about 40 mol %. Hydrogen concentration in the second retentate stream may be less than about 4 mol % and methane concentration may be at least about 50 mol %. From the second membrane unit 172, the hydrogen concentration in the second permeate stream in a second permeate line 178 may be at least about 60 mol % with the methane concentration being less than about 30 mol %. Hydrogen concentration in the second permeate stream may be at least about 70 mol % and methane concentration may be less than about 20 mol %. The pressure in the second retentate stream in the second retentate line 176 may be substantially the same as in the first retentate stream in the first retentate line 168. The pressure in the second permeate stream in the second permeate line 168 may be roughly between about 2.5 MPa (300 psig) and about 3.5 MPa (500 psig) which may be less than a third of the pressure in the depressurized, first retentate stream. The second membrane 174 can be installed into the second membrane unit 172 with or without support backing as a plurality of tubes. The first retentate stream may be fed to inside the tubes with the permeate diffusing peripherally out of the tubes.

The second permeate stream in second permeate line 178 may be fed with a make-up gas stream in make-up line 186 to the compressor train 180. The second permeate stream may be fed to a first stage compressor 184 which may then be fed to the second stage compressor 182 which is downstream of the first stage compressor 184. The first stage compressor 184 is in downstream communication with the second membrane unit 172, specifically the other side of the second membrane 178. Because it has sufficient pressure, the first permeate stream in first permeate line 170 bypasses the first stage compressor 184 and feeds the second stage compressor 182. The compressor train 180 provides the hydrogen stream in the hydrogen line 22.

Turning back to the separation section 14, the hydrocarbonaceous hot liquid stream in the hot bottoms line 54 may be sent to the fractionation section. In an aspect, the hot liquid stream in the hot bottoms line 54 may be let down in pressure and flashed in a hot flash drum 72 to provide a hot flash vapor stream of light ends in a hot flash overhead line 74 and a hot flash liquid stream in a hot flash bottoms line 76. The hot flash drum 72 may be in direct, downstream communication with the hot bottoms line 54 and in downstream communication with the hydroprocessing unit 12. In an aspect, the hot flash liquid stream in the hot flash bottoms line 76 may be forwarded to product fractionation which may be preceded by stripping to remove hydrogen sulfide from product streams including the hydroprocessed resid stream. Accordingly, a stripping column and a fractionation column may be in downstream communication with the hot flash drum 72 and the hot flash bottoms line 76.

The hot flash drum 72 may be operated at the same temperature as the hot separator 50 but at a lower pressure of between about 1.4 MPa (gauge) (200 psig) and about 6.9 MPa (gauge) (1000 psig), suitably no more than about 3.8 MPa (gauge) (550 psig). The hot flash liquid stream in the hot flash bottoms line 76 may have a temperature of the operating temperature of the hot flash drum 72.

In an aspect, the cold liquid stream in the cold bottoms line 60 may be sent to fractionation. In a further aspect, the cold liquid stream may be let down in pressure and flashed in a cold flash drum 78 to separate fuel gas from the cold liquid stream in the cold bottoms line 60 and provide a cold flash liquid stream in a cold flash bottoms line 82. The cold flash drum 78 may be in direct downstream communication with the cold bottoms line 60 of the cold separator 56. In a further aspect, the cold flash drum 78 may separate the cold liquid stream in the cold bottoms line 60 to provide a fuel gas stream in a cold flash overhead line 86 and a cold flash liquid stream in a cold flash bottoms line 82. In an aspect, the cold liquid stream in the cold bottoms line 60 and the hot flash vapor stream in the hot flash overhead line 74 may be flash separated in the cold flash drum 78 together. The cold flash liquid stream in the cold flash bottoms line 82 may be sent to product fractionation which may be preceded by stripping to remove hydrogen sulfide from product streams including a hydroprocessed resid stream. Accordingly, a stripping column and a fractionation column may be in downstream communication with the cold flash drum 78 and the cold flash bottoms line 82.

The cold flash drum 78 may be operated at the same temperature as the cold separator 56 but typically at a lower pressure of between about 1.4 MPa (gauge) (200 psig) and about 6.9 MPa (gauge) (1000 psig) and preferably between about 3.0 MPa (gauge) (435 psig) and about 3.8 MPa (gauge) (550 psig). A flashed aqueous stream may be removed from a boot of the cold flash drum 78. The flash cold liquid stream in the flash cold bottoms line 82 may have the same temperature as the operating temperature of the cold flash drum 78.

The fractionation section 16 may include the stripping column 90 and a fractionation column 110. The stripping column 90 may be in downstream communication with a separator 50, 72, 56 and 78 or a bottoms line in the separation section 14 for stripping volatiles from a hydrocracked stream. For example, the stripping column 90 may be in downstream communication with the hot bottoms line 54, the hot flash bottoms line 76, the cold bottoms line 60 and/or the cold flash bottoms line 82. In an aspect, the stripping column 90 may be a vessel that contains a cold stripping column 92 and a hot stripping column 94 with a wall that isolates each of the stripping columns 92, 94 from the other. The cold stripping column 92 may be in downstream communication with the hydroprocessing unit 12 comprising the resid hydrotreating reactor 30 and/or a hydrocracking reactor, the cold bottoms line 60 and, in an aspect, the cold flash bottoms line 82 for stripping the cold liquid stream. The hot stripping column 94 may be in downstream communication with the hydroprocessing unit 12 and the hot bottoms line 54 and, in an aspect, the hot flash bottoms line 76 for stripping a hot liquid stream which is hotter than the cold liquid stream. The hot liquid stream may be hotter than the cold liquid stream, by at least 25° C. and preferably at least 50° C.

The cold flash liquid stream comprising the hydroprocessed resid stream in the cold flash bottoms line 82 may be heated and fed to the cold stripping column 92 at an inlet which may be in a top half of the column. The cold flash liquid stream which comprises the hydrocracked stream may be stripped of gases in the cold stripping column 92 with a cold stripping media which is an inert gas such as steam from a cold stripping media line 96 to provide a cold stripper vapor stream of naphtha, hydrogen, hydrogen sulfide, steam and other gases in a cold stripper overhead line 98 and a liquid cold stripped stream in a cold stripper bottoms line 100. The cold stripper vapor stream in the cold stripper overhead line 98 may be condensed and separated in a receiver 102. A stripper net overhead line 104 from the receiver 102 carries a net stripper off gas of LPG, light hydrocarbons, hydrogen sulfide and hydrogen. Unstabilized liquid naphtha from the bottoms of the receiver 102 may be split between a reflux portion refluxed to the top of the cold stripping column 92 and a liquid stripper overhead stream which may be transported in a condensed stripper overhead line 106 to further recovery or processing. A sour water stream may be collected from a boot of the overhead receiver 102.

The cold stripping column 92 may be operated with a bottoms temperature between about 150° C. (300° F.) and about 288° C. (550° F.), preferably no more than about 260° C. (500° F.), and an overhead pressure of about 0.7 MPa (gauge) (100 psig), preferably no less than about 0.50 MPa (gauge) (72 psig), to no more than about 2.0 MPa (gauge) (290 psig). The temperature in the overhead receiver 102 ranges from about 38° C. (100° F.) to about 66° C. (150° F.) and the pressure is essentially the same as in the overhead of the cold stripping column 92.

The cold stripped stream in the cold stripper bottoms line 100 may comprise predominantly naphtha and kerosene boiling materials. The cold stripped stream in line 100 may be heated and fed to the product fractionation column 110. The product fractionation column 110 may be in downstream communication with the hydroprocessing unit 12, the cold stripper bottoms line 100 of the cold stripping column 92 and the stripping column 90. In an aspect, the product fractionation column 110 may comprise more than one fractionation column. The product fractionation column 110 may be in downstream communication with one, some or all of the hot separator 50, the cold separator 56, the hot flash drum 72 and the cold flash drum 78.

The hot flash liquid stream comprising a hydrocracked stream in the hot flash bottoms line 76 may be fed to the hot stripping column 94 near a top thereof. The hot flash liquid stream may be stripped in the hot stripping column 94 of gases with a hot stripping media which is an inert gas such as steam from a line 108 to provide a hot stripper overhead stream of naphtha, hydrogen, hydrogen sulfide, steam and other gases in a hot stripper overhead line 112 and a liquid hot stripped stream in a hot stripper bottoms line 114. The hot stripper overhead line 112 may be condensed and a portion refluxed to the hot stripping column 104. However, in an embodiment, the hot stripper overhead stream in the hot stripper overhead line 112 from the overhead of the hot stripping column 94 may be fed into the cold stripping column 92 directly in an aspect without condensing or refluxing. The inlet for the cold flash bottoms line 82 carrying the cold flash liquid stream may be at a higher elevation than the inlet for the hot stripper overhead line 112. The hot stripping column 94 may be operated with a bottoms temperature between about 160° C. (320° F.) and about 360° C. (680° F.) and an overhead pressure of about 0.7 MPa (gauge) (100 psig), preferably no less than about 0.50 MPa (gauge) (72 psig), to no more than about 2.0 MPa (gauge) (290 psig).

At least a portion of the hot stripped stream comprising a hydrocracked effluent stream in the hot stripped bottoms line 114 may be heated and fed to the product fractionation column 110. The product fractionation column 110 may be in downstream communication with the hot stripped bottoms line 114 of the hot stripping column 94. The hot stripped stream in the hot stripped bottoms line 114 may be at a hotter temperature than the cold stripped stream in line 100.

The product fractionation column 110 may be in downstream communication with the cold stripping column 92 and the hot stripping column 94 and may comprise more than one fractionation column for separating stripped hydroprocessed streams into product streams. The product fractionation column 110 may also be in downstream communication with the hot separator 50, the cold separator 56, the hot flash drum 72, the scrubber separator 154 and the cold flash drum 78. The product fractionation column 110 may fractionate the cold stripped stream and the hot stripped stream by means of an inert stripping gas stream fed from stripping line 134. The product streams from the product fractionation column 110 may include a net fractionated overhead stream comprising naphtha in a net overhead line 126, an optional heavy naphtha stream in line 128 from a side cut outlet, a kerosene stream carried in line 130 from a side cut outlet and a diesel stream in diesel line 132 from a side outlet.

An unconverted gas oil stream boiling above the diesel cut point may be taken in a fractionator bottoms line 140 from a bottom of the product fractionation column 110. A portion or all of the gas oil stream in the fractionator bottoms line 140 may be purged from the process, recycled to the hydroprocessing unit 12 or forwarded to a hydrocracking unit or a fluid catalytic cracking unit (not shown).

Product streams may also be stripped to remove light materials to meet product purity requirements. A fractionated overhead stream in an overhead line 148 may be condensed and separated in a receiver 150 with a portion of the condensed liquid being refluxed back to the product fractionation column 110. The net fractionated overhead stream in line 126 may be further processed or recovered as naphtha product. The product fractionation column 110 may be operated with a bottoms temperature between about 260° C. (500° F.) and about 385° C. (725° F.), preferably at no more than about 380° C. (715° F.), and at an overhead pressure between about 7 kPa (gauge) (1 psig) and about 69 kPa (gauge) (10 psig). A portion of the gas oil stream in the fractionator bottoms line 140 may be reboiled and returned to the product fractionation column 110 instead of adding an inert stripping media stream such as steam in line 134 to heat to the product fractionation column 110.

Figure 2:
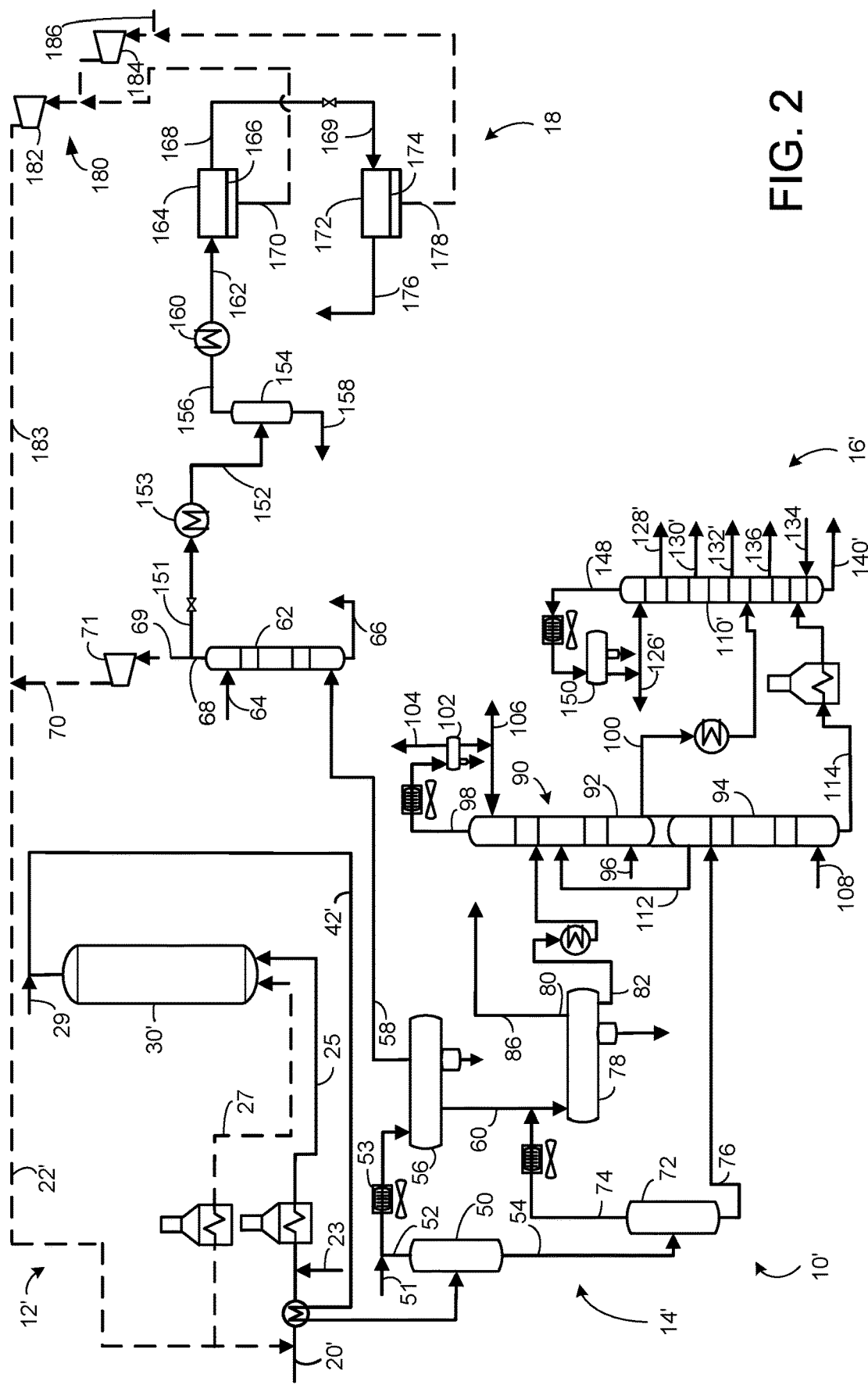
FIG. 2 is a schematic drawing of a hydroprocessing unit comprising a slurry hydrocracking unit.

FIG. 2 shows an embodiment of an apparatus and process 10' comprising a hydroprocess unit 12' that includes a slurry hydrocracking reactor 30' for hydroprocessing a resid stream. Elements in FIG. 2 with the same configuration as in FIG. 1 will have the same reference numeral as in FIG. 1. Elements in FIG. 2 which have a different configuration as the corresponding element in FIG. 1 will have the same reference numeral but designated with a prime symbol ('). The configuration and operation of the embodiment of FIG. 2 is essentially the same as in FIG. 1.

Slurry hydrocracking (SHC) involves the processing of a mixture of residue and fine particulate catalyst in an upflow reactor in a hydrogen-rich environment. The SHC reaction environment facilitates very high conversion of residue to liquid products, particularly distillate boiling-range components. In FIG. 2, a hydrocarbon resid stream in resid line 20' and a hydrogen stream in the hydrogen line 22' are heated to temperature in separate heaters with a portion of the hydrogen stream and the required amount of catalyst from catalyst line 23 being routed through the oil heater. The outlet streams 25 and 27 from both heaters are fed to the bottom of the hydroprocessing reactor 30' comprising the SHC reactor. The hydroprocessed resid stream in the hydroprocessed resid effluent line 42' is quenched at the reactor outlet with quench from line 29 to terminate reactions and then is processed in the separation section 14' and the fractionation section 16' and the hydrogen recovery section 18 as described for FIG. 1. The fractionation section 16' provides light ends in line 126', naphtha in line 128', diesel in line 130', light vacuum gas oil in line 132', heavy vacuum gas oil in line 136 and pitch in line 140'. Heavy vacuum gas oil 136 may be partially recycled to SHC reactor 30' for further conversion (not shown). The fractionation column 110' may also include a vacuum column (not shown).

In one embodiment, the slurry hydrocracking catalyst is $Fe_{(1-x)}S$, where x is between 0 and 0.2. The $Fe_{(1-x)}S$ catalyst is contacted with a suitable acid, such as $H_2SO_4$, forming an aqueous solution of $FeSO_4$. The $H_2S$ gas formed can be sent to a scrubber. The pitch residue can be separated from the aqueous solution of $FeSO_4$ before neutralizing the $FeSO_4$ with a neutralizing agent, such as NaOH, if desired. The neutralized $FeSO_4$ is contacted with a sulfide anion, for example from $Na_2S$, to precipitate $Fe_{(1-x)}S$. The $Fe_{(1-x)}S$ can be recovered and recycled back to the slurry hydrocracking reactor 30'. Catalyst is lost during the process, and fresh catalyst makeup is required. In some processes, the fresh catalyst makeup can be up to 1 wt % or more. In addition, the processes can produce about 2-20 wt % pitch.

The remainder of the hydroprocessing unit 10' in FIG. 2 operates as described for FIG. 1.

EXAMPLES

We simulated operation of the hydrogen recovery unit 18 described herein. The properties of each stream are provided in Table 1.

TABLE 1

| Property | Feed | First Retentate | First Permeate | Second Membrane Feed | Second Retentate | Second Permeate |
|---|---|---|---|---|---|---|
| Stream in FIGS. | 162 | 168 | 170 | 169 | 176 | 178 |
| Temp., ° C. | 63 | 77 | 63 | 62 | 83 | 62 |
| (° F.) | (145) | (170) | (145) | (144) | (181) | (144) |
| Pressure, kPa | 11983 | 11983 | 4722 | 9549 | 9549 | 2482 |
| (psig) | (1738) | (1738) | (685) | (1385) | (1385) | (360) |
| Molar Flow, kgmole/hr | 1273 | 283 | 990 | 283 | 103 | 180 |
| (lbmole/hr) | (2808) | (624) | (2183) | (624) | (226) | (398) |
| Mass Flow, kg/hr | 5916 | 3787 | 2130 | 3787 | 2632 | 1159 |
| (lb/hr) | (13043) | (8348) | (4695) | (8348) | (5803) | (2555) |
| Hydrogen, mol % | 88.09 | 49.23 | 99.2 | 49.23 | 3.37 | 75.28 |
| Hydrogen kgmole/hr | 1122 | 139 | 983 | 139 | 4 | 136 |
| (lbmole/hr) | (2473) | (307) | (2166) | (307) | (8) | (300) |
| Methane, mol % | 7.36 | 31.09 | 0.57 | 31.09 | 51.07 | 19.74 |

Of the 2473 lb moles of hydrogen fed to the process, the two membrane units were able to recover 2465 lb moles of hydrogen in the two permeate streams.

Specific Embodiments

While the following is described in conjunction with specific embodiments, it will be understood that this description is intended to illustrate and not limit the scope of the preceding description and the appended claims.

A first embodiment of the invention is a process for hydroprocessing a hydrocarbon resid stream comprising hydroprocessing a resid stream in the presence of hydrogen and a hydroprocessing catalyst to provide a hydroprocessed resid stream; separating the hydroprocessed resid stream to provide a vapor stream comprising hydrogen and methane and a liquid stream; taking a purge vapor stream from the vapor stream; feeding the purge vapor stream to a membrane unit comprising a membrane and contacting the vapor stream on one side of the membrane to allow more of the hydrogen to diffuse through the membrane than the methane; removing from an opposite side of the membrane a permeate stream comprising a higher concentration of hydrogen than a concentration of hydrogen in the vapor stream. An embodiment of the invention is one, any or all of prior embodiments in this paragraph up through the first embodiment in this paragraph wherein the membrane unit is a first membrane unit and the permeate stream is a first permeate stream and further comprising removing a first retentate stream from the one side of the membrane comprising a higher concentration of methane than a concentration of methane in the purge vapor stream and feeding the first retentate stream to a second membrane unit comprising a second membrane and contacting the first retentate stream on one side of the second membrane to allow more of the hydrogen to diffuse through the second membrane than the methane; and removing from an opposite side of the second membrane a second permeate stream comprising a higher concentration of hydrogen than a concentration of hydrogen in the first retentate stream. An embodiment of the invention is one, any or all of prior embodiments in this paragraph up through the first embodiment in this paragraph further comprising feeding the first permeate stream to a compressor. An embodiment of the invention is one, any or all of prior embodiments in this paragraph up through the first embodiment in this paragraph further comprising feeding the second permeate stream to a compressor. An embodiment of the invention is one, any or all of prior embodiments in this paragraph up through the first embodiment in this paragraph further comprising feeding the second permeate stream to a first stage compressor and feeding the first permeate stream to a second stage compressor that is downstream of the first stage compressor. An embodiment of the invention is one, any or all of prior embodiments in this paragraph up through the first embodiment in this paragraph further comprising separating the hydroprocessed effluent stream in a hot separator to provide a hot vapor stream and a hot liquid stream and separating the hot vapor stream in a cold separator into a cold vapor stream and a cold liquid stream and taking the purge vapor stream from the cold vapor stream. An embodiment of the invention is one, any or all of prior embodiments in this paragraph up through the first embodiment in this paragraph wherein a pressure of the vapor stream fed to the membrane unit is between about 50 and about 100% of the pressure of the cold vapor stream exiting the cold separator. An embodiment of the invention is one, any or all of prior embodiments in this paragraph up through the first embodiment in this paragraph further comprising scrubbing the cold vapor stream with a solvent to absorb hydrogen sulfide to provide a scrubbed vapor stream and taking the purge vapor stream from the scrubbed vapor stream. An embodiment of the invention is one, any or all of prior embodiments in this paragraph up through the first embodiment in this paragraph further comprising taking a process vapor stream from the scrubbed vapor stream, cooling the process vapor stream to provide a cooled, process stream, removing liquid from the cooled, process stream to provide a dried, cooled, process stream, and heating the dried, cooled, process stream to provide a heated, dried, cooled, process stream and taking the purge vapor stream from the heated, flashed, cooled process stream. An embodiment of the invention is one, any or all of prior embodiments in this paragraph up through the first embodiment in this paragraph further comprising reducing the pressure of the first retentate stream before it is fed to the second membrane unit.

A second embodiment of the invention is a process for hydroprocessing a hydrocarbon resid stream comprising hydroprocessing a resid stream in the presence of hydrogen and a hydroprocessing catalyst to provide a hydroprocessed resid stream; separating the hydroprocessed resid stream to provide a vapor stream comprising hydrogen and methane and a liquid stream; taking a purge vapor stream from the vapor stream; feeding the purge vapor stream to a first membrane unit comprising a first membrane and contacting the vapor stream on one side of the first membrane to allow more of the hydrogen to permeate the membrane than the methane; removing from an opposite side of the membrane a first permeate stream comprising a higher concentration of hydrogen than a concentration of hydrogen in the vapor stream; removing a first retentate stream from the one side of the membrane comprising a higher concentration of methane than a concentration of methane in the vapor stream; feeding the first retentate stream to a second membrane unit comprising a second membrane and contacting the first retentate stream on one side of the second membrane to allow more of the hydrogen to permeate the second membrane than the methane; and removing from an opposite side of the second membrane a second permeate stream comprising a higher concentration of hydrogen than a concentration of hydrogen in the first retentate stream. An embodiment of the invention is one, any or all of prior embodiments in this paragraph up through the second embodiment in this paragraph further comprising feeding the second permeate stream to a first stage of a compressor and feeding the first permeate stream to a second stage of the compressor that is downstream of the first stage. An embodiment of the invention is one, any or all of prior embodiments in this paragraph up through the second embodiment in this paragraph further comprising separating the hydroprocessed effluent stream in a hot separator to provide a hot vapor stream and a hot liquid stream and separating the hot vapor stream in a cold separator into a cold vapor stream and a cold liquid stream and taking the purge vapor stream from the cold vapor stream. An embodiment of the invention is one, any or all of prior embodiments in this paragraph up through the second embodiment in this paragraph wherein a pressure of the vapor stream fed to the membrane unit is between about 50 and about 100% of the pressure of the cold vapor stream exiting the cold separator. An embodiment of the invention is one, any or all of prior embodiments in this paragraph up through the second embodiment in this paragraph further comprising scrubbing the cold vapor stream with a solvent to absorb hydrogen sulfide to provide a scrubbed vapor stream and taking the purge vapor stream from the scrubbed vapor stream. An embodiment of the invention is one, any or all of prior embodiments in this paragraph up through the second embodiment in this paragraph further comprising taking a process vapor stream from the scrubbed vapor stream, cooling the process vapor stream to provide a cooled, process stream, removing liquid from the cooled, process stream to provide a dried, cooled, process stream, and heating the dried, cooled, process stream to provide a heated, dried, cooled, process stream and taking the purge vapor stream from the heated, flashed, cooled process stream. An embodiment of the invention is one, any or all of prior embodiments in this paragraph up through the second embodiment in this paragraph further comprising reducing the pressure of the first retentate stream before it is fed to the second membrane unit.

A third embodiment of the invention is a hydroprocessing apparatus comprising a hydroprocessing reactor, a separator in communication with the hydroprocessing reactor; a scrubber column in communication with an overhead line of the separator; a membrane unit in communication with the scrubber column; a compressor in communication with the membrane unit. An embodiment of the invention is one, any or all of prior embodiments in this paragraph up through the third embodiment in this paragraph wherein the membrane unit is a first membrane unit and further comprising a second membrane unit in communication with the first membrane unit and the compressor in communication with the second membrane unit. An embodiment of the invention is one, any or all of prior embodiments in this paragraph up through the third embodiment in this paragraph wherein the compressor is a second stage compressor and further comprising a first stage compressor in communication with the second membrane unit and a second stage compressor in communication with the first membrane unit through bypass of the first stage compressor.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for hydroprocessing a hydrocarbon resid stream comprising:
   hydroprocessing a resid stream in the presence of hydrogen and a hydroprocessing catalyst to provide a hydroprocessed resid stream;
   separating said hydroprocessed resid stream to provide a vapor stream comprising hydrogen and methane and a liquid stream;
   taking a purge vapor stream from said vapor stream;

feeding said purge vapor stream to a first membrane unit comprising a membrane and contacting said vapor stream on one side of the first membrane to allow more of the hydrogen to diffuse through the first membrane than the methane; and removing from an opposite side of the first membrane a first permeate stream comprising a higher concentration of hydrogen than a concentration of hydrogen in said vapor stream;

removing a first retentate stream from said one side of the first membrane comprising a higher concentration of methane than a concentration of methane in said purge vapor stream;

feeding the first retentate stream to a second membrane unit comprising a second membrane and contacting the first retentate stream on one side of the second membrane to allow more of the hydrogen to diffuse through the second membrane than the methane, wherein a pressure of the first retentate stream is reduced by about 2.1 MPa (300 psig) to about 2.8 MPa (400 psig) before the first retentate stream is fed to the second membrane unit; and removing from an opposite side of the second membrane a second permeate stream comprising a higher concentration of hydrogen than a concentration of hydrogen in the first retentate stream.

2. The process of claim 1 further comprising separating said hydroprocessed effluent stream in a hot separator to provide a hot vapor stream and a hot liquid stream and separating said hot vapor stream in a cold separator into a cold vapor stream and a cold liquid stream and taking said purge vapor stream from said cold vapor stream.

3. The process of claim 2 wherein a pressure of said vapor stream fed to the membrane unit is between about 50 and about 100% of the pressure of said cold vapor stream exiting the cold separator.

4. The process of claim 2 further comprising scrubbing said cold vapor stream with a solvent to absorb hydrogen sulfide to provide a scrubbed vapor stream and taking said purge vapor stream from said scrubbed vapor stream.

5. The process of claim 4 further comprising taking a process vapor stream from said scrubbed vapor stream, cooling said process vapor stream to provide a cooled, process stream, removing liquid from said cooled, process stream to provide a dried, cooled, process stream, and heating said dried, cooled, process stream to provide a heated, dried, cooled, process stream and taking said purge vapor stream from said heated, flashed, cooled process stream.

6. A process for hydroprocessing a hydrocarbon resid stream comprising:

hydroprocessing a resid stream in the presence of hydrogen and a hydroprocessing catalyst to provide a hydroprocessed resid stream;

separating said hydroprocessed resid stream to provide a vapor stream comprising hydrogen and methane and a liquid stream;

taking a purge vapor stream from said vapor stream;

feeding said purge vapor stream to a first membrane unit comprising a first membrane and contacting said vapor stream on one side of the first membrane to allow more of the hydrogen to permeate the membrane than the methane;

removing from an opposite side of the membrane a first permeate stream comprising a higher concentration of hydrogen than a concentration of hydrogen in said vapor stream;

removing a first retentate stream from said one side of said membrane comprising a higher concentration of methane than a concentration of methane in said vapor stream;

feeding said first retentate stream to a second membrane unit comprising a second membrane and contacting said first retentate stream on one side of the second membrane to allow more of the hydrogen to permeate the second membrane than the methane, wherein a pressure of the first retentate stream is reduced by about 2.1 MPa (300 psig) to about 2.8 MPa (400 psig) before the first retentate stream is fed to the second membrane unit; and removing from an opposite side of the second membrane a second permeate stream comprising a higher concentration of hydrogen than a concentration of hydrogen in said first retentate stream;

wherein a pressure of said purge vapor stream fed to the first membrane unit is between about 50 and about 100% of the pressure of a cold vapor stream exiting a cold separator.

7. The process of claim 6 further comprising separating said hydroprocessed effluent stream in a hot separator to provide a hot vapor stream and a hot liquid stream and separating said hot vapor stream in said cold separator into said cold vapor stream and a cold liquid stream and taking said purge vapor stream from said cold vapor stream.

8. The process of claim 7 further comprising scrubbing said cold vapor stream with a solvent to absorb hydrogen sulfide to provide a scrubbed vapor stream and taking said purge vapor stream from said scrubbed vapor stream.

9. The process of claim 8 further comprising taking a process vapor stream from said scrubbed vapor stream, cooling said process vapor stream to provide a cooled, process stream, removing liquid from said cooled, process stream to provide a dried, cooled, process stream, and heating said dried, cooled, process stream to provide a heated, dried, cooled, process stream and taking said purge vapor stream from said heated, flashed, cooled process stream.

10. The process of claim 1 wherein a hydrogen concentration in the first retentate stream is at least 40 mol % and a methane concentration in the first retentate stream is no more than 40 mol %.

11. The process of claim 1 wherein a hydrogen concentration in the first permeate stream is at least 98 mol % and a methane concentration in the first permeate stream is less than about 1 mol %.

12. The process of claim 1 wherein a hydrogen concentration in the first permeate stream is at least 99 mol % and a methane concentration in the first permeate stream is less than 1 mol %.

13. The process of claim 1 wherein a hydrogen concentration in the second retentate stream is less than 5 mol % and a methane concentration in the second retentate stream is at least 40 mol %.

14. The process of claim 1 wherein a hydrogen concentration in the second permeate stream is at least 60 mol % and a methane concentration in the second retentate stream is less than 30 mol %.

15. The process of claim 1 wherein a hydrogen concentration in the second retentate stream is at least 70 mol % and a methane concentration in the second retentate stream is less than 20 mol %.

16. The process of claim 1 further comprising feeding said first permeate stream to a compressor.

17. The process of claim 1 further comprising feeding said second permeate stream to a compressor.

18. The process of claim 1 further comprising feeding said second permeate stream to a first stage compressor and feeding said first permeate stream to a second stage compressor that is downstream of said first stage compressor.

* * * * *